(12) United States Patent
Jordan et al.

(10) Patent No.: US 7,194,912 B2
(45) Date of Patent: Mar. 27, 2007

(54) CARBON NANOTUBE-BASED SENSOR AND METHOD FOR CONTINUALLY SENSING CHANGES IN A STRUCTURE

(75) Inventors: Jeffrey D. Jordan, Williamsburg, VA (US); Anthony Neal Watkins, Hampton, VA (US); Donald M. Oglesby, Virginia Beach, VA (US); JoAnne L. Ingram, Norfolk, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 25 days.

(21) Appl. No.: 10/890,843

(22) Filed: Jul. 13, 2004

(65) Prior Publication Data

US 2006/0010996 A1    Jan. 19, 2006

(51) Int. Cl.
*G01L 1/00* (2006.01)
(52) U.S. Cl. ............................... 73/774; 374/100
(58) Field of Classification Search ................ 73/767, 73/768, 774, 775, 779, 780; 374/100, 163, 374/183–185
See application file for complete search history.

(56) References Cited

U.S. PATENT DOCUMENTS

| | | | |
|---|---|---|---|
| 5,184,516 A | 2/1993 | Blazic et al. | |
| 5,195,046 A | 3/1993 | Gerardi et al. | |
| 5,549,803 A | 8/1996 | Schoess et al. | |
| 6,191,519 B1 | 2/2001 | Nye et al. | |
| 6,231,980 B1 * | 5/2001 | Cohen et al. | 428/402 |
| 6,276,214 B1 * | 8/2001 | Kimura et al. | 73/795 |
| 6,370,964 B1 | 4/2002 | Chang et al. | |
| 6,528,020 B1 * | 3/2003 | Dai et al. | 422/98 |
| 6,564,640 B1 | 5/2003 | Allaei | |
| 6,672,925 B2 * | 1/2004 | Talin et al. | 445/49 |
| 6,705,152 B2 * | 3/2004 | Routkevitch et al. | 73/31.05 |
| 6,803,260 B2 * | 10/2004 | Shin et al. | 438/142 |
| 6,828,039 B2 * | 12/2004 | Sugawara | 428/621 |
| 6,835,613 B2 * | 12/2004 | Schlaf | 438/199 |
| 6,837,928 B1 * | 1/2005 | Zhang et al. | 117/95 |
| 6,848,320 B2 * | 2/2005 | Miyajima et al. | 73/763 |
| 6,855,603 B2 * | 2/2005 | Choi et al. | 438/268 |
| 2002/0117659 A1 | 8/2002 | Lieber et al. | |
| 2002/0159943 A1 | 10/2002 | Smalley et al. | |

(Continued)

FOREIGN PATENT DOCUMENTS

JP    11241903 A2    9/1999

(Continued)

*Primary Examiner*—Robert Raevis
(74) *Attorney, Agent, or Firm*—Helen M. Galus; Kurt G. Hammerle (57) ABSTRACT

A sensor has a plurality of carbon nanotube (CNT)-based conductors operatively positioned on a substrate. The conductors are arranged side-by-side, such as in a substantially parallel relationship to one another. At least one pair of spaced-apart electrodes is coupled to opposing ends of the conductors. A portion of each of the conductors spanning between each pair of electrodes comprises a plurality of carbon nanotubes arranged end-to-end and substantially aligned along an axis. Because a direct correlation exists between resistance of a carbon nanotube and carbon nanotube strain, changes experienced by the portion of the structure to which the sensor is coupled induce a change in electrical properties of the conductors.

23 Claims, 4 Drawing Sheets

U.S. PATENT DOCUMENTS

| | | |
|---|---|---|
| 2003/0089899 A1 | 5/2003 | Lieber et al. |
| 2003/0185985 A1 | 10/2003 | Bronikowski et al. |
| 2003/0218224 A1 | 11/2003 | Schlaf et al. |
| 2004/0004485 A1 | 1/2004 | Lee et al. |
| 2004/0012062 A1 | 1/2004 | Miyajima et al. |

FOREIGN PATENT DOCUMENTS

| | | |
|---|---|---|
| WO | WO 02/48701 A2 | 12/2001 |
| WO | WO 02/31179 A2 | 4/2002 |
| WO | WO 03/005450 A2 | 1/2003 |

* cited by examiner

CARBON NANOTUBE-BASED SENSOR AND METHOD FOR CONTINUALLY SENSING CHANGES IN A STRUCTURE

ORIGIN OF THE INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

FIELD OF THE INVENTION

This invention relates to sensors and sensing methods that use carbon nanotubes. More specifically, the invention is a carbon nanotube-based sensor and method for continually sensing changes in strain, pressure, and/or temperature experienced by a structure.

SUMMARY OF THE INVENTION

In accordance with the present invention, a sensor is provided for detecting changes experienced by a structure. A substrate, adapted to be coupled to a portion of a structure, has a plurality of carbon nanotube (CNT)-based conductors coupled thereto. The conductors are arranged side-by-side to one another. At least one pair of spaced-apart electrodes is coupled to opposing ends of the conductors with the conductors electrically coupling each pair of spaced-apart electrodes to one another. A portion of each of the conductors spans between each pair of spaced-apart electrodes and is defined by a plurality of carbon nanotubes arranged end-to-end and substantially aligned along an axis. A change in electrical properties of the conductors is induced by changes experienced by the portion of the structure to which the sensor is coupled. In use, electrical properties of the conductors are monitored when the portion of the structure is experiencing baseline levels of at least one of strain, temperature, and pressure to establish a baseline response. The electrical properties are continuously monitored over time.

DETAILED DESCRIPTION OF THE INVENTION

Figure 1:
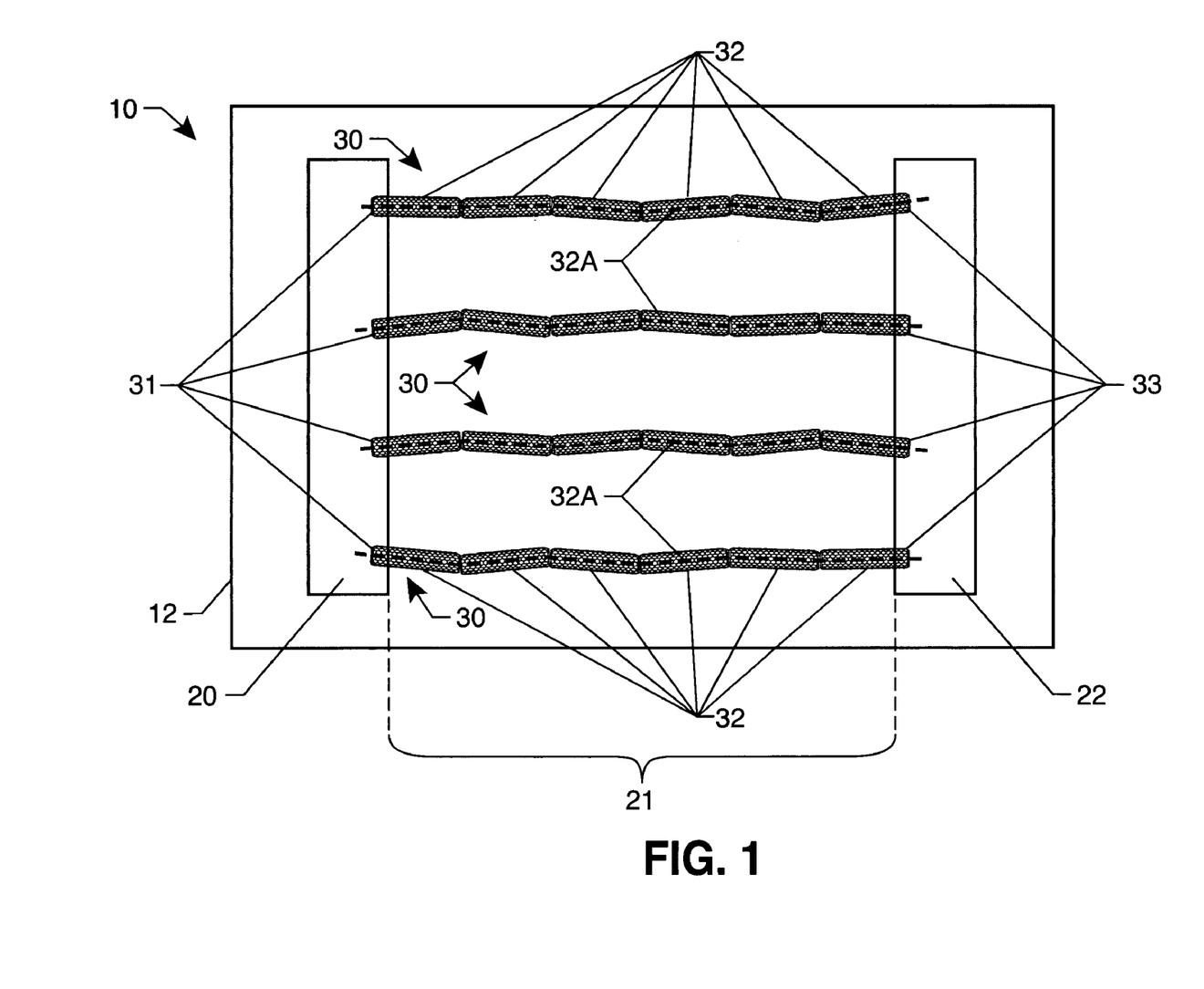
FIG. 1 is a plan view of a sensor assembly depicting aligned CNT-based conductors, the ends of which are coupled to a pair of spaced-apart electrodes in accordance with an embodiment of the present invention.

Referring now to the drawings, and more particularly to FIG. 1, a sensor assembly in accordance with the present invention is shown and referenced generally by numeral 10. It is to be understood that sensor assembly 10 is shown and will be described herein for purposes of demonstrating the concepts of the present invention. However, it is to be understood that the particular structure and construction of sensor assembly 10 are not limitations of the present invention.

Sensor assembly 10 includes a substrate 12 with spaced-apart electrodes 20 and 22 positioned on substrate 12 such that portions thereof oppose one another with a gap 21 being defined therebetween. Electrodes 20 and 22 can be, but are not required to be, parallel to one another as is the case in the illustrated example.

A plurality of CNT-based conductors 30 comprising a number of carbon nanotubes (CNTs) 32 are operatively positioned on substrate 12. Such operative positioning may include depositing the CNTs 32 directly on substrate 12, adhering the CNTs 32 to substrate 12 by means of an adhesive (not shown) interposed between the CNTs and the substrate, or otherwise coupling the CNTs 32 to substrate 12 for support thereby. Regardless of the method or system used to operatively position the CNTs 32, each conductor 30 spans gap 21 between opposing portions of electrodes 20 and 22. The plurality of CNTs 32 are arranged end-to-end and aligned to define an electrical conduction path among the aligned ones of CNTs 32 between the electrodes 20 and 22. An example of this conduction path occurs, for example, when each CNT's longitudinal (or tube) axis 32A is substantially perpendicular to electrodes 20 and 22. The CNTs positioned and aligned by the present invention can be single-wall or multi-wall carbon nanotubes.

Opposing ends 31, 33 of each conductor 30 are in electrical contact with a respective one of electrodes 20, 22. For clarity of illustration, the size of CNTs 32 is greatly exaggerated and only four CNT-based conductors 30 are shown. However, as would be understood by one of ordinary skill in the art, many more such CNT-based conductors can and would most likely be present in the actual sensing device.

To achieve the structure illustrated in FIG. 1, sensor assembly 10 can be constructed in accordance with the teachings of U.S. patent application Ser. No. 10/730,188, filed Dec. 4, 2003, and entitled "CONTROLLED DEPOSITION AND ALIGNMENT OF CARBON NANOTUBES," the contents of which are hereby incorporated by reference. This method provides for the controlled deposition and alignment of carbon nanotubes. Briefly, a CNT attraction material is deposited on a substrate in the gap region between two electrodes on the substrate. An electric potential is applied to the two electrodes. The CNT attraction material is wetted with a solution defined by a carrier liquid having CNTs suspended therein. A portion of the CNTs align with the electric field and adhere to the CNT attraction material. The carrier liquid and any CNTs not adhered to the CNT attraction material are then removed thereby leaving the structure illustrated in FIG. 1. For clarity of illustration, the figures used to describe the present invention omit the CNT attraction material.

Figure 2:
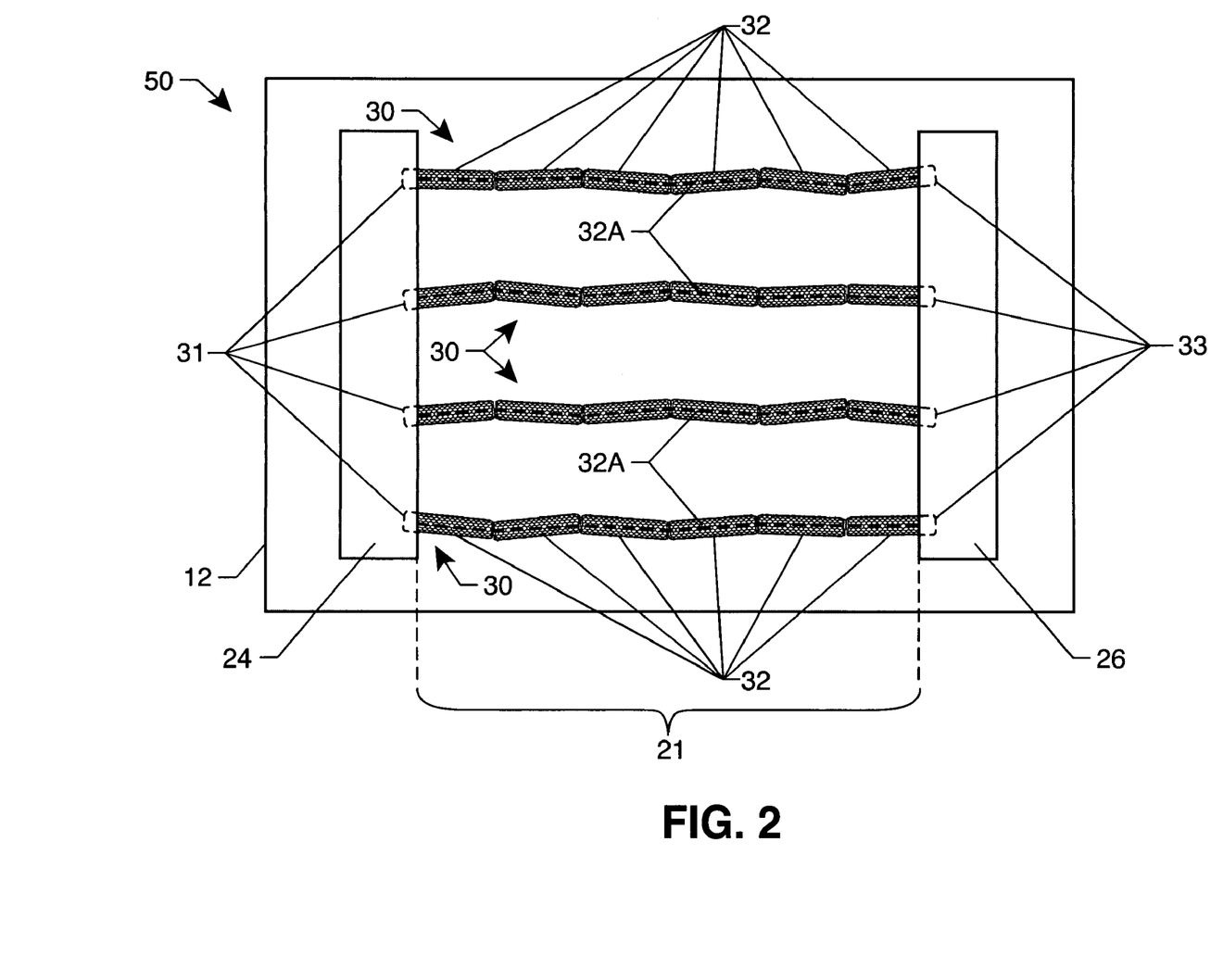
FIG. 2 is a plan view of another sensor assembly depicting aligned CNT-based conductors, the ends of which are coupled to a pair of spaced-apart electrodes on top of the CNT-based conductors in accordance with another embodiment of the present invention.
Figure 3:
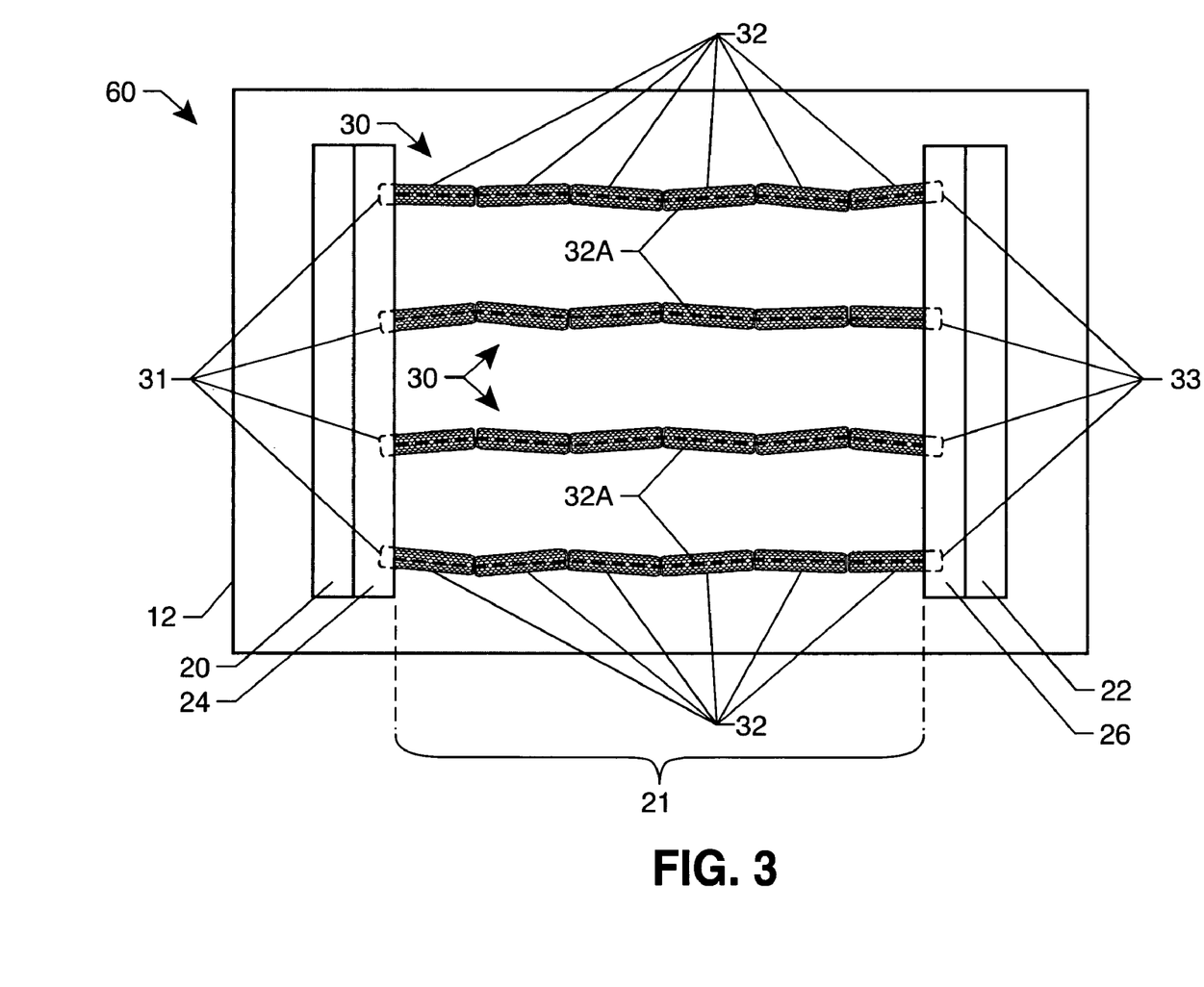
FIG. 3 is a plan view of another sensor assembly depicting aligned CNT-based conductors, the ends of which are sandwiched between electrodes in accordance with still another embodiment of the present invention.

The present invention is not limited to the sensor assembly construction described for sensor assembly 10. For example, FIG. 2 illustrates a sensor assembly 50 having electrodes 24 and 26 positioned onto the opposing ends 31, 33, respectively, of a set of CNT-based conductors 30. This type of construction allows electrodes 24 and 26 to anchor the opposing ends 31, 33 of each CNT-based conductor 30 in place on substrate 12. This type of construction may be employed when "sheets" of substrate 12/conductors 30 are manufactured without the electrodes 20, 22 attached thereto. The conductor "sheets" are cut into appropriately sized and shaped pieces, and subsequently have electrode material deposited thereon to make the sensor assembly. FIG. 3 illustrates a sensor assembly 60 having both electrodes 20/22 and electrodes 24/26 essentially "sandwiching" the opposing ends of CNT-based conductors 30. The use of two electrode pairs provides for redundant interrogation of CNT-based conductors 30.

Each of the above-described sensor assemblies can be used to monitor strain, pressure, or temperature changes experienced by a structure to which the sensor assembly is coupled. The structure can be dynamic in nature (e.g., air, space, water, or land craft) or static in nature (e.g., building, bridge, etc.). Typically, substrate 12 is coupled to a portion of a structure that is to be monitored with the sensor assembly being capable of monitoring changes at that portion of the structure. Substrate 12 may be part of the structure itself provided CNT-based conductors 30 can be deposited thereon. The sensor assembly can be optimized to monitor specific types of change. For example, if changes in a structure's strain experience are of concern, substrate 12 can be made from a flexible material such as a polymer (e.g., polyimide, polyethylene terephthalate, polyimide with copper embedded therein, etc.) or an elastomer. If the sensor assembly is to be optimized for monitoring pressure and/or temperature changes, substrate 12 could be made from an inflexible material (e.g., silicon, silicon dioxide, diamond-like-carbon or DLC, etc.). If the sensor assembly were to be optimized for temperature alone, substrate 12 could be made from an inflexible material and the CNT-based conductor portion of the assembly could be coated with a rigid, air-impermeable membrane to eliminate pressure sensitivity.

Figure 4:
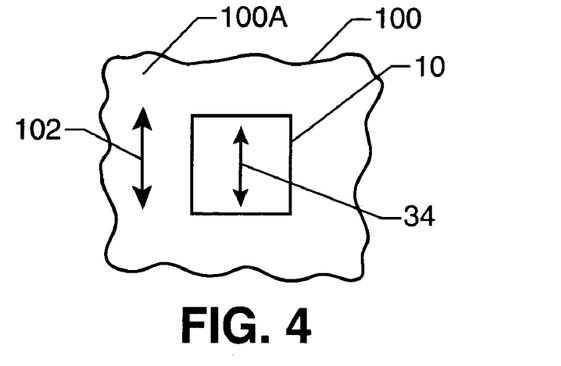
FIG. 4 is a plan view of a portion of the surface of a structure with a single sensor of the present invention coupled to the surface of the structure.

Referring now to FIGS. 4–8, several installation configurations of the sensor assembly(ies) are shown. FIG. 4 shows one sensor assembly (e.g., sensor assembly 10) coupled to an outer skin or surface 100A of a structure 100. A two-headed arrow 34 is used to illustrate the tube alignment direction (i.e., the substantial direction of tube axes 32A shown in FIGS. 1–3) for the CNT-based conductors of sensor assembly 10. Thus, in terms of monitoring changes in strain experienced by surface 100A of structure 100, sensor assembly 10 will be sensitive to strain experienced along a direction 102 (the axis of sensitivity) that is substantially parallel to tube alignment direction 34.

Figure 5:
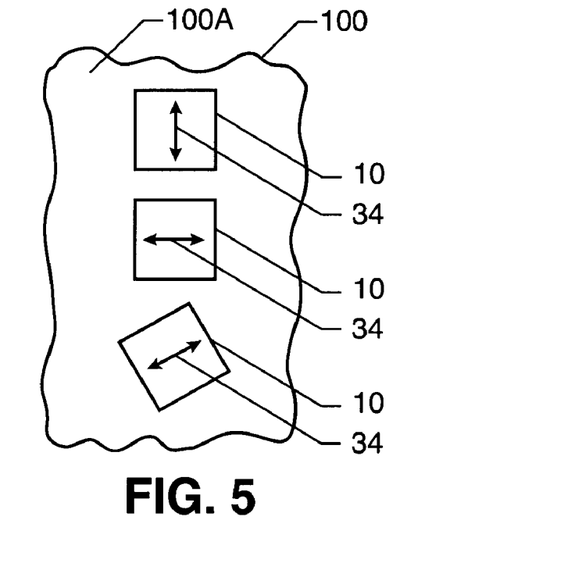
FIG. 5 is a plan view of a portion of the surface of a structure with a plurality of sensors of the present invention coupled to the surface of the structure.
Figure 6:
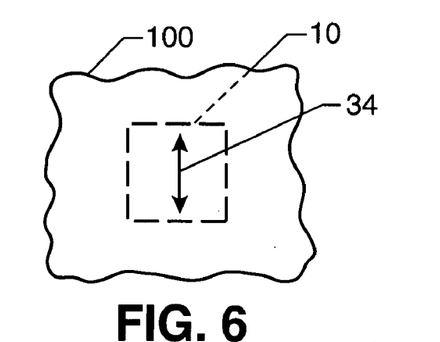
FIG. 6 is a plan view of a portion of the surface of a structure with a single sensor of the present invention embedded within the structure as indicated by its dashed line outline.
Figure 7:
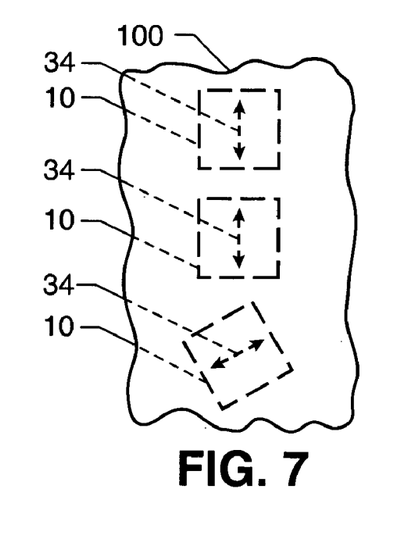
FIG. 7 is a plan view of a portion of the surface of a structure with a plurality of sensors of the present invention embedded within the structure as indicated by their dashed line outlines.
Figure 8:
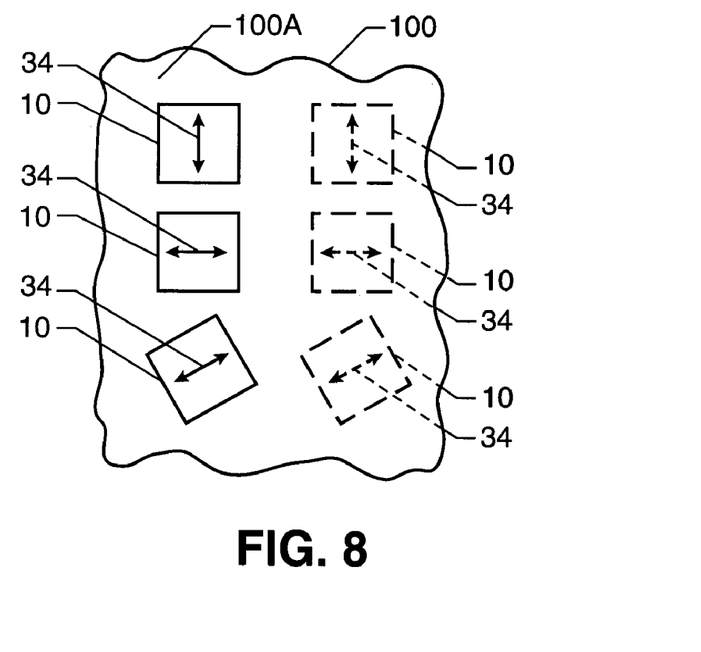
FIG. 8 is a plan view of a portion of the surface of a structure with a plurality of sensors of the present invention coupled to the surface of the structure and a plurality of sensors of the present invention embedded within the structure as indicated by their dashed line outlines.

A plurality of sensor assemblies 10 could also be applied/coupled to surface 100A of structure 100 as illustrated in FIG. 5 where the tube alignment direction 34 of each assembly 10 is oriented uniquely to provide for strain measurements along different axes. Still further, installation of one (FIG. 6) or more (FIG. 7) sensor assemblies 10 can be made within (i.e., embedded) structure 100 to monitor internal strain, pressure, or temperature changes. FIG. 8 illustrates an embodiment in which sensor assemblies 10 are mounted both on surface 100A and within structure 100 with their respective tube alignment directions 34 oriented at different angles.

The process of monitoring changes experienced by a structure involves coupling one or more of the above-described sensor assemblies to a structure at the place or places of interest. Once positioned, each sensor assembly is electrically interrogated by means of an AC or DC voltage applied to each sensor's electrode pair. Such electrical interrogation is performed while the structure is experiencing known or baseline levels of strain, pressure, and/or temperature conditions so that the electrical properties (e.g., conductance, capacitance, inductance, etc.) of the CNT-based conductors for a sensor assembly (10, 50, or 60) are indicative of the known baseline conditions. Sensors optimized for different parameters can be utilized at the same time. After baseline conditions are established, the electrical properties of each sensor assembly are continuously monitored over time. Because a direct correlation exists between resistance of a carbon nanotube and carbon nanotube strain, changes in the electrical properties of a sensor assembly are indicative of changes in one or more of the parameters of strain, pressure, and temperature experienced by the structure, depending upon how each sensor was optimized. In terms of dynamic structures, such monitoring could occur during use whereas monitoring of static structures could run continually throughout the life of the structure.

The combination of multiple CNT-based conductors and the multiple CNT structure of each such CNT-based conductor provides the basis for operation of a robust sensor assembly. Specifically, the use of multiple CNTs aligned and arranged end-to-end form an electrical conductor that is strong yet flexible. The bonds between adjacent CNTs may be stressed during times of mechanical strain and thereby affect the electrical properties thereof. Once the strain is removed, the CNT-based conductors tend to "relax" and return to their baseline state. The ability of each CNT-based conductor to "stretch" in this fashion also provides the ability to monitor gradual change in electrical properties. This ability to monitor gradual change in electrical properties enables evaluating long-term structural fatigue. Furthermore, the use of multiple CNT-based conductors provides redundancy in cases where one or more of the conductors fail during extreme conditions. In terms of monitoring pressure and/or temperature changes, the CNT-based conductors have a high-degree of electron transfer sensitivity, thereby providing the ability to monitor even small changes experienced by a structure.

Potential structures for coupling or embedding of the sensor assemblies include air, space, and ground vehicles. Automotive applications include measurement of engine torque conversion and vehicle compartment noise. Other automotive applications include air-bag triggers (e.g., strain sensor arrays in vehicle crumple zones) and passenger seat temperature/pressure sensors.

Potential civil engineering structures for coupling or embedding of the sensor assemblies include bridges and buildings. Civil engineering applications include testing new configurations and materials for robustness, monitoring the effects of meteorological events, and retrofitting existing buildings with surface sensors to monitor potential areas for integrity failure and initiate building evacuation if appropriate.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed as new and desired to be secured by Letters Patent of the United States is:

1. A sensor for detecting changes experienced by a structure, comprising:
    a substrate adapted to be coupled to a portion of a structure;
    a plurality of carbon nanotube (CNT)-based conductors operatively positioned on said substrate and arranged side-by-side to one another;
    at least one pair of spaced-apart electrodes coupled to opposing ends of said plurality of CNT-based conductors with said plurality of CNT-based conductors electrically coupling each pair of said spaced-apart electrodes to one another;
    a CNT attraction material deposited on said substrate, bonded to said plurality of CNT-based conductors, and spanning between said at least one pair of spaced-apart electrodes; and
    a portion of each of said plurality of CNT-based conductors spanning between said at least one pair of spaced-apart electrodes comprising a plurality of carbon nanotubes arranged end-to-end and substantially aligned along an axis, wherein upon said substrate being coupled to the portion of the structure, changes experienced by the portion of the structure induce a change in electrical properties of said plurality of CNT-based conductors.

2. A sensor as in claim 1 wherein said substrate is flexible such that the strain experienced by the portion of the structure causes relative strain in said substrate.

3. A sensor as in claim 1 wherein said at least one pair of spaced-apart electrodes comprises one spaced-apart electrode pair positioned on said substrate, with said opposing ends of said plurality of CNT-based conductors being positioned on said spaced-apart electrode pair.

4. A sensor as in claim 1 wherein said at least one pair of spaced-apart electrodes comprises two pairs of spaced-apart electrodes positioned on the opposing ends of said plurality of CNT-based conductors.

5. A sensor as in claim 1 wherein said at least one pair of spaced-apart electrodes comprises: a first pair of spaced-apart electrodes positioned on said substrate, with said opposing ends of said plurality of CNT-based conductors being positioned on said first pair of spaced-apart electrodes; and
    a second pair of spaced-apart electrodes positioned on the opposing ends of each of said plurality of CNT-based conductors.

6. A sensor as in claim 1 wherein each of said plurality of carbon nanotubes is a single-wall carbon nanotube.

7. A sensor as in claim 1 wherein each of said at least one pair of spaced-apart electrodes comprises parallel electrodes.

8. A sensor as in claim 1 wherein the CNT-based conductors are arranged substantially parallel to one another.

9. A sensor as in claim 1 further comprising said CNT attraction material being deposited on a portion of said at least one pair of spaced apart electrodes.

10. A sensor for detecting changes experienced by a structure, comprising:
    a flexible substrate adapted to be coupled to a portion of a structure;
    a plurality of carbon nanotube (CNT)-based conductors and operatively positioned on said substrate and arranged side-by-side to one another; and
    at least one air of spaced-apart electrodes positioned on and across opposing ends of said plurality of CNT-based conductors, thereby anchoring said ends to said flexible substrate, with said plurality of CNT-based conductors electrically coupling each pair of said spaced-apart electrodes to one another;
    a portion of each of said plurality of CNT-based conductors spanning between said at least one pair of spaced-apart electrodes comprising a plurality of carbon nanotubes arranged end-to-end and substantially aligned along an axis, wherein upon said flexible substrate being coupled to the portion of the structure, changes experienced by the portion of the structure induce a change in electrical properties of said plurality of CNT-based conductors; and
    wherein said at least one pair of spaced-apart electrodes comprises:
        a first pair of spaced-apart electrodes positioned on said substrate; and
        a second pair of spaced-apart electrodes positioned on and across the opposing ends of each of said plurality of CNT-based conductors.

11. A method of detecting changes experienced by a structure, said method comprising the steps of:
    coupling at least one sensor to a portion of the structure, each said sensor comprising (i) a plurality of carbon nanotube (CNT)-based conductors arranged side-by-side to one another, and (ii) at least one pair of spaced-apart electrodes electrically coupled to opposing ends of said plurality of CNT-based conductors with a portion of each of said plurality of CNT-based conductors spanning between each pair of said spaced-apart electrodes comprising a plurality of carbon nanotubes arranged end-to-end and substantially aligned along an axis;
    monitoring electrical properties of said plurality of CNT-based conductors when the portion of the structure is experiencing baseline levels of at least one of the parameters of strain, temperature, and pressure to establish a baseline response; and
    continually monitoring the electrical properties over time to identify any change from the baseline response, wherein a change in the electrical properties of said plurality of CNT-based conductors is indicative of changes in the at least one parameter experienced by the portion of the structure.

12. A method according to claim 11 wherein said step of coupling comprises the step of embedding said at least one sensor in the structure.

13. A method according to claim 11 wherein said step of coupling comprises the step of coupling said at least one sensor to a surface of the structure.

14. A method according to claim 11 wherein said at least one sensor comprises a plurality of sensors, and wherein said step of coupling comprises the steps of:
embedding a portion of said plurality of sensors in the structure; and
coupling a remainder of said plurality of sensors to a surface of the structure.

15. A method according to claim 11 wherein said at least one sensor comprises a plurality of sensors, and wherein said step of coupling comprises the step of arranging said plurality of sensors such that the axis associated with each one of said plurality of sensors is at an orientation unique to the axis of each of the other of said plurality of sensors.

16. A method according to claim 11 wherein each of said plurality of carbon nanotubes is a single-wall carbon nanotube.

17. A method of detecting changes experienced by a structure, said method comprising the steps of:
coupling at least one sensor to a portion of the structure, each said sensor comprising (i) a substrate adapted to be coupled to a portion of a structure, (ii) a plurality of carbon nanotube (CNT)- based conductors operatively positioned on said substrate and arranged side-by-side to one another, and (iii) at least one pair of spaced-apart electrodes electrically coupled to opposing ends of said plurality of CNT-based conductors with a portion of each of said plurality of CNT-based conductors spanning between each pair of said spaced-apart electrodes comprising a plurality of carbon nanotubes arranged end-to-end and substantially aligned along an axis;
monitoring electrical properties of said plurality of CNT-based conductors when the portion of the structure is experiencing baseline levels of at least one of the parameters of strain, temperature, and pressure to establish a baseline response; and
continually monitoring the electrical properties over time to identify any change in the electrical properties from the baseline response, wherein a change in the electrical properties of said plurality of CNT-based conductors is indicative of changes in the at least one parameter experienced by the portion of the structure.

18. A method according to claim 17 wherein said step of coupling comprises the step of embedding said at least one sensor in the structure.

19. A method according to claim 17 wherein said step of coupling comprises the step of coupling said at least one sensor to a surface of the structure.

20. A method according to claim 17 wherein said at least one sensor comprises a plurality of sensors, and wherein said step of coupling comprises the steps of:
embedding a portion of said plurality of sensors in the structure; and
coupling a remainder of said plurality of sensors to a surface of the structure.

21. A method according to claim 17 wherein said at least one sensor comprises a plurality of sensors, and wherein said step of coupling comprises the step of arranging said plurality of sensors such that the axis of sensitivity associated with each one of said plurality of sensors is at an orientation unique to the axis of sensitivity of each of the other of said plurality of sensors.

22. A method according to claim 17 wherein said substrate is flexible such that strain experienced by the portion of the structure causes relative strain in said substrate.

23. A method according to claim 17 wherein each of said plurality of carbon nanotubes is a single-wall carbon nanotube.

* * * * *

UNITED STATES PATENT AND TRADEMARK OFFICE
Certificate

Patent No. 7,194,912 B2                                    Patented: March 27, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeffrey D. Jordan, Williamsburg, VA (US); Anthony Neal Watkins, Hampton, VA (US); Donald M. Oglesby, Virginia Beach, VA (US); JoAnne L. Ingram, Norfolk, VA (US); Jan M. Smits, Monument, CO (US); Phillip A. Williams, Suffolk, VA (US); and Russell A. Wincheski, Williamsburg, VA (US).

Signed and Sealed this Twenty-second Day of April 2008.

CHRISTINA JOHNSON
*Supervisory Patent Examiner*
Art Unit 1791